United States Patent [19]

Yasufuku et al.

[11] Patent Number: 4,953,784
[45] Date of Patent: Sep. 4, 1990

[54] VENTILATOR DRIVE SYSTEM

[75] Inventors: Hitoshi Yasufuku; Toshikazu Ogata, both of Nagayo, Japan

[73] Assignee: Kabushiki Kaisha Toshiba, Kawasaki, Japan

[21] Appl. No.: 334,819

[22] Filed: Apr. 10, 1989

Related U.S. Application Data

[63] Continuation of Ser. No. 099919, Sep. 22, 1987, abandoned.

[30] Foreign Application Priority Data

Dec. 24, 1986 [JP] Japan .................. 61-313767

[51] Int. Cl.⁵ .............................................. F24F 7/00
[52] U.S. Cl. .................................. 236/44 A; 236/49.3; 98/42.04
[58] Field of Search ............... 236/44 E, 44 A, 44 R, 236/49 D; 98/42.04, 39.1; 200/61.06

[56] References Cited

U.S. PATENT DOCUMENTS

| | | | |
|---|---|---|---|
| 2,234,858 | 3/1941 | Brown et al. | 236/44 E |
| 2,275,708 | 3/1942 | Whitney | 236/44 R |
| 2,279,582 | 4/1942 | Russel | 200/61.06 |
| 2,707,880 | 5/1955 | Wannamaker, Jr. | 236/44 C |
| 2,943,245 | 6/1960 | Ohlheiser | 236/44 E |
| 3,332,620 | 7/1967 | Streed | 236/44 A |

FOREIGN PATENT DOCUMENTS 58-156134 9/1983 Japan .

*Primary Examiner*—William E. Wayner
*Attorney, Agent, or Firm*—Foley & Lardner, Schwartz, Jeffery, Schwaab, Mack, Blumenthal & Evans

[57] ABSTRACT

A ventilator drive system includes a fan for exhausting an indoor air to the outdoors and introducing an outdoor air to an indoor side, an electric motor for driving the fan, a humidity sensor having a humidity sensing element which abuts against an indoor side surface of a room wall as close as possible or which is located so that heat is transferred from the room wall, and a control circuit for comparing a signal from the humidity sensor with a reference signal. The motor is energized when the relative humidity is increased to a reference level or above.

1 Claim, 3 Drawing Sheets

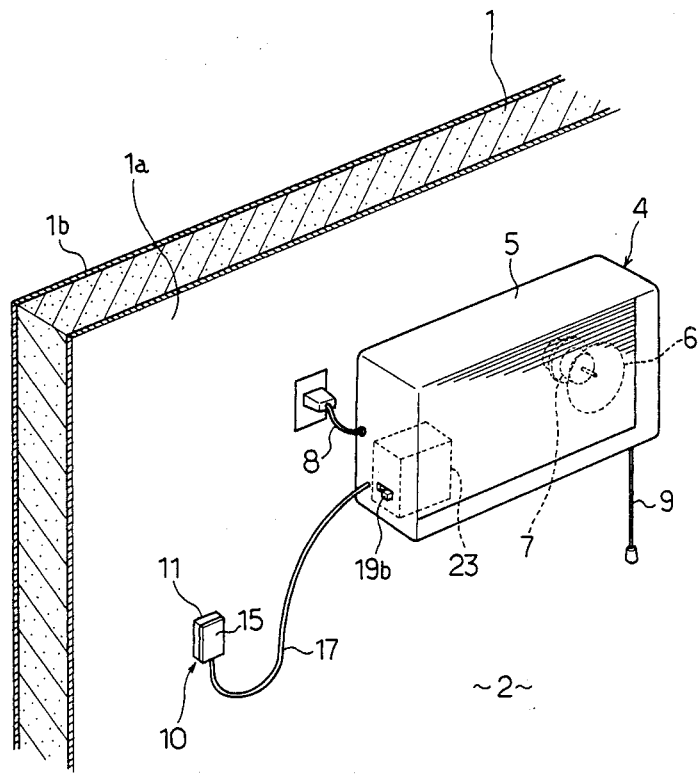
Fig. 1
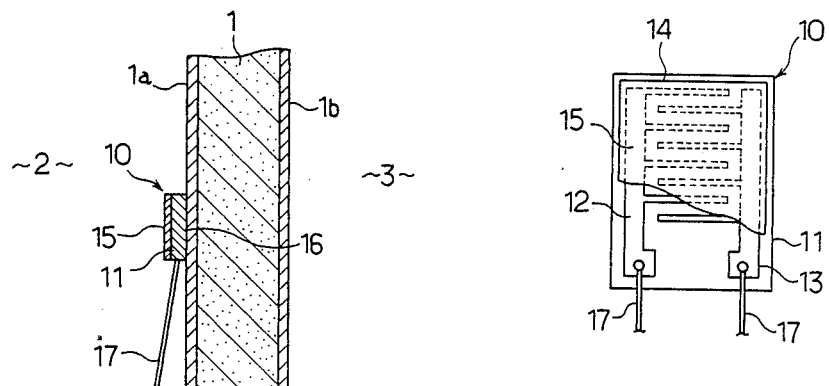
Fig. 2
Fig. 3

VENTILATOR DRIVE SYSTEM

This application is a continuation of application Ser. No. 099,919, filed Sept. 22, 1987, now abandoned.

BACKGROUND OF THE INVENTION

1. Field of the Invention

This invention relates to a drive system for ventilator comprising a fan driven by an electric motor, and more particularly to a ventilator drive system provided with a humidity sensor for sensing the relative humidity in a room to be ventilated, thereby automatically starting a ventilating operation before the occurrence of the dewing on indoor side surfaces of walls of the room.

2. Description of the prior Art

Bathroom ventilation systems are well known in the art. One of such bathroom ventilation systems is disclosed in Japanese patent Laid-open Application No. 58-156134. In this bathroom ventilation system, a ventilating unit is provided in a bathroom and comprises a fan for exhausting an indoor air to the outdoors and introducing an outdoor air into the bathroom and an electric motor for driving the fan. A humidity sensor is also provided in the bathroom for sensing the relative humidity in the bathroom.

According to the above described bathroom ventilation system, the humidity sensor produces a signal when the relative humidity in the bathroom is increased to a reference value set therein or above. The operation of the ventilating unit is automatically started based on the signal produced by the humidity sensor, thereby exhausting a humid air from the bathroom. Bathroom walls or the like may thus be protected against the humid air.

Whereas, an average temperature reaches 20° C. and the relative humidity only increases to 40% in a room such as a living room when the heating operation is performed. Although the relative humidity in the bathroom reaches 90%, it does not increase so much in the living room. Whereas, the temperature of the room walls is generally decreased in winter since the outdoor side surfaces of the room walls are brought into contact with cold outdoor air. When the temperature of the room walls is decreased to, for example, 9° C. as the dew-point temperature or below, the dewing occurs on the indoor side surfaces of the room walls even if the indoor temperature reaches 20° C. with the relative humidity of 40%, thereby damaging the room walls and the like.

In the above mentioned circumstances, even when the prior art ventilation system described above is applied to the living room or the like. The occurrence of the dewing cannot be prevented. The reason for this is that the operation of the ventilating unit is started when the relative humidity in the room reaches 90%. Whereas, the relative humidity in the living room cannot generally be increased to 90%. Should the relative humidity of the living room be increased to 90%, some measure would artificially be taken to decrease the relative humidity. Furthermore, the reason is that the occurrence of the dewing on the indoor side surface of the room wall is influenced by the outdoor temperature even when the relative humidity in the room takes a relatively small value such as 40%.

SUMMARY OF THE INVENTION

Therefore, a primary object of the present invention is to provide an improved ventilator drive system which can prevent the occurrence of the dewing on the indoor side surfaces of room walls and the like.

A second object of the present invention is to provide an improved ventilator drive system which can prevent an uneconomical ventilating operation for the prevention of the dewing when the relative humidity of an outdoor air is high, for example, when it is raining.

In view of these objects and others, the present invention provides an improved ventilator drive system comprising a fan for exhausting an indoor air to the outdoor side and introducing an outdoor air into a room, an electric motor for driving the fan, a humidity sensing means including a humidity sensing element which changes its electrical characteristic (its resistance value, for example) when subjected to moisture contained in air, and a control circuit for controlling the motor by comparing a signal supplied from the humidity sensing means with a reference signal. Particularly, the humidity sensing element is provided on the indoor side surface of the room wall as close as possible so that the surface temperature of the humidity sensing element closely approximates to the surface temperature of the indoor side surface of the room wall or so that heat is transferred from the indoor side surface of the room wall to the humidity sensing element of the humidity sensing means.

According to on form of the ventilator drive system of this invention, the humidity sensing element of the humidity sensing means is brought into contact with air which is cooled down to the extent that approximates to the indoor temperature. When the relative humidity of the cooled air is high (90%, for example) so that the dewing is about to occur, the control circuit acts to automatically energize the motor based on the signal supplied from the humidity sensing means, thereby performing the ventilating operation. An outdoor air containing less quantity of moisture than the indoor air is introduced into the room. Therefore, the occurrence of the dewing on the indoor side surfaces of the walls of the room and the like can be prevented.

Another form of the ventilator drive system in accordance with this invention comprises a means for selectively setting the magnitude of any one of plurality of reference signals, that is, reference levels of the relative humidity in the room. When a high reference level is selectively set beforehand in the case that the humidity of the outdoor air is high owing to, for example, the raining, the control circuit acts not to start the ventilating operation which will otherwise be continued for a long time. In this case, the ventilating operation is performed when the relative humidity in the room is abnormally increased.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

In the accompanying drawings:

FIG. 1 is a perspective view illustrating the arrangements of the heat-exchange type ventilating unit and the humidity sensing means of a first embodiment in accordance with this invention;

FIG. 2 is a longitudinal section of the humidity sensing means mounted on a room wall;

FIG. 3 is a partially cutaway plan view of the humidity sensing element of the humidity sensing means;

DESCRIPTION OF THE PREFERRED EMBODIMENTS

Figure 4:
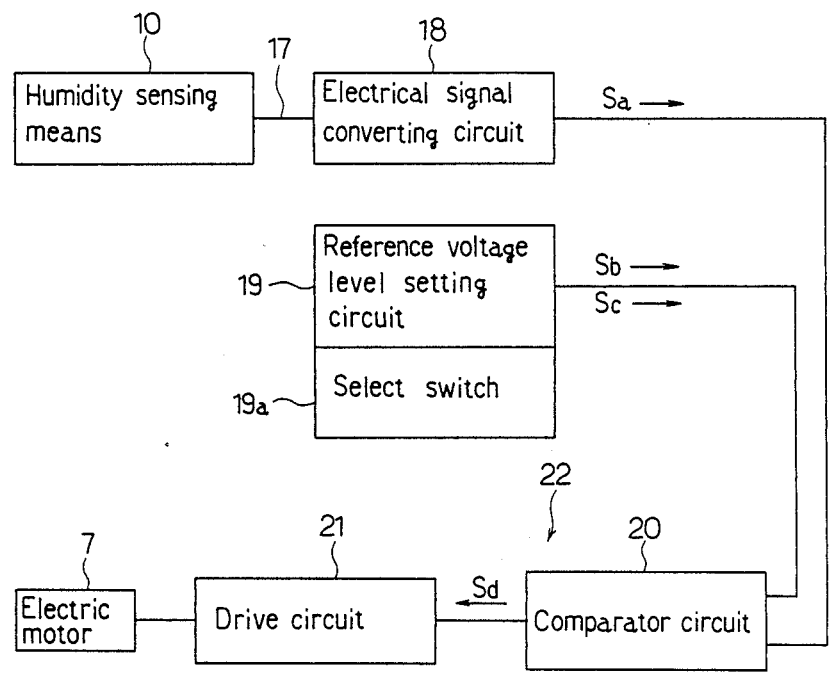
FIG. 4 is a block diagram illustrating the electrical arrangements of the ventilator drive system of the first embodiment.

Referring to FIGS. 1 and 2 showing the ventilator drive system of a first embodiment, reference numeral 1 indicates a room wall partitioning an indoor side 2 from an outdoor side 3. A ventilating unit is mounted on the indoor side surface 1a of the room wall 1. In this embodiment, a heat-exchange type ventilating unit 4 is employed as the ventilating unit. As well known in the art, the heat exchange type ventilating unit 4 comprises a fan assembly 6 including two fans for exhaust and inlet operations respectively, an electric motor 7 for driving the fan assembly 6, and a heat exchanger (not shown), all of which are enclosed in a casing 5. When the fan assembly 6 is driven by the motor 7, the rotation of the fan assembly 6 causes an air of the indoor side 2 to pass through one of two passageways (not shown) of the heat exchanger, thereby exhausting the indoor air to the outdoor side 3. Simultaneously, an air of the outdoor side 3 is introduced through the other passageway of the heat exchanger into the indoor side 2, thereby performing the heat exchange between the air of the indoor side 2 and of the outdoor side 3. Numerals 8 and 9 indicate a power-supply cord and a switch string, respectively. As shown in FIGS. 2 and 3, a humidity sensing means 10 comprises an insulated board 11 formed of alumina, comb shaped electrodes 12 and 13 provided on the insulated board 11 in a spaced-apart relation, and a humidity-sensitive resistance film 14 provided on the electrodes 12 and 13, all of which members constitute a humidity sensing element 15. The humidity sensing means 10 is well known in the art as a high polymer humidity sensor of the electric resistance type. The humidity sensing means 10 is mounted on the indoor side surface 1a of the room wall 1 so that a humidity non-sensitive surface 16 thereof opposed to the humidity sensing element 15 abuts against an indoor side surface 1a of the room wall 1 for heat transmission there between. Accordingly, the surface temperature of the humidity sensing element 15 is maintained at the approximately same temperature as that of the indoor side surface 1a of the room wall 1. A signal feed line 17 is connected between the humidity sensing means 10 and an electrical signal converting circuit 18 which will be described hereafter.

Referring now to FIG. 4, the electrical signal converting circuit 18 is connected to the humidity sensing means 10 through the signal feed line 17 as described above. The electrical signal converting circuit 18 is arranged to change its electrical resistance value in accordance with a value of the relative humidity sensed by the humidity sensing means 10 and to produce a signal Sa, the voltage level of which corresponds to the resistance value thereof. A reference voltage level setting circuit 19 is provided with a select switch 19a. A plurality of reference voltage levels may be set in the reference voltage level setting circuit 19. In this embodiment, two reference voltage levels are selectively set in the circuit 19 by operation of the select switch 19a. Of the two reference voltage levels, a first reference voltage level is selected so as to correspond to the relative humidity of 90%. The other or a second reference voltage level is selected so as to correspond to the relative humidity of 100%. The reference voltage setting circuit 19 is arranged to selectively produce a reference voltage level signal Sb or Sc corresponding to the first or second reference voltage level, respectively. A comparator circuit 20 and a drive circuit 21 constitute a control circuit 22. One of input terminals of the comparator circuit 20 is connected to an output terminal of the electrical signal converting circuit 18. The other input terminal of the comparator circuit 20 is connected to an output terminal of the reference voltage level setting circuit 19. An output terminal of the comparator circuit 20 is connected to an input terminal of the drive circuit 21. A drive signal Sd is supplied from the comparator circuit 20 to the drive circuit 21, which is arranged to keep energizing the motor 7 while the drive signal Sd is continuously supplied thereto, as will hereinafter be described in detail.

Turning now to FIG. 1, a control box 23 is provided in the casing 5. The control box 23 contains a wiring board (not shown) on which the electrical signal converting circuit 18, the reference voltage level setting circuit 19 and the control circuit 22 and the like are printed. A switch knob 19b of the select switch 19a projects out of the casing 5.

The operation of the ventilator drive system of the first embodiment will now be described. In winter, the switch knob 19b of the select switch 19a is operated so that the reference voltage level signal Sb corresponding to the relative humidity of 90% is produced by the reference voltage level setting circuit 19. While the heating operation is being performed in the indoor side 2, the temperature at the indoor side 2 is increased to 20° C. with an average relative humidity of 40%. Whereas, since the outdoor side surface 1b of the room wall 1 is in contact with a cold outdoor air, the temperature of the room wall 1 is relatively low. The temperature of the indoor side surface 1a of the room wall 1 is decreased owing to the cold outdoor air. The surface temperature of the humidity sensing element 15 becomes approximately equal to the temperature of the indoor side surface 1a of the room wall 1 as the humidity sensing element 15 is in contact with the indoor side surface 1a of the room wall 1. Thus, the relative humidity of the air in the vicinity of the indoor side surface 1a of the room wall 1 is sensed by the humidity sensing means The humidity sensing means 10 has the characteristic that the resistance value thereof is increased with the increase of the relative humidity sensed by the means 10. The electrical signal converting circuit 18 changes the voltage level of the signal Sa in accordance with the resistance value of the humidity sensing means 10. When the temperature of the indoor side surface 1a of the room wall 1 is decreased to 9° C. as the dew-point temperature or below owing to the cold outdoor air, the relative humidity of the air in the vicinity of the indoor side surface 1a of the room wall 1 is increased to 90% or above. Consequently, the dewing tends to occur on the indoor side surface 1a of the room wall 1. Since the comparator circuit 20 is arranged to produce the drive signal Sd at its output terminal when the voltage level of the signal Sa is increased to that of the voltage level of the reference voltage level signal Sb or above, that is, when the relative humidity of the air in the vicinity of the indoor side surface 1a is increased to 90% or above. Accordingly, when receiving the drive signal Sd, the drive circuit 21 acts to energize the motor 7 to thereby drive the fan assembly 6. As the fan assembly 6 is driven, the humid air at the indoor side 2 is discharged through one of the passageways of the heat exchanger (not shown) to the outdoor side 3. Simultaneously, the outdoor air is introduced to the indoor side 2 through the other passage way of the heat exchanger, thereby performing the ventilating operation. Since the heat exchange is performed between the exhaust air and the inlet air in the heat exchanger, the inlet air is heated owing to the heat contained in the exhaust air and introduced to the indoor side 2. When the outdoor air containing less moisture is introduced to the indoor side 2 by the above described ventilating operation, the relative humidity of the air in the vicinity of the indoor side surface 1a of the room wall 1 is decreased. Afterwards, when the relative humidity of the air in the vicinity of the indoor side surface 1a of the room wall 1 is decreased to 90%, the resistance value of the humidity sensing means 10 is also decreased. Consequently, the voltage level of the signal Sa produced by the electrical signal converting circuit 18 is decreased to that of the reference voltage level signal Sb or below, whereby the comparator circuit 20 acts to stop producing the drive signal Sd. As a result, the drive circuit 21 acts to deenergize the motor 7 to thereby stop driving the fan assembly 6. The ventilating operation is thus completed.

Both of the temperature at the outdoor side 3 and the humidity in the indoor side 2 tend to be increased in the rainy season or when it is raining. In the circumstances, the relative humidity of the outdoor air is increased to 90% or above. In such a case, when the reference voltage level corresponding to the relative humidity of 90% is continuously set in the reference voltage level setting circuit 19, the ventilating operation is automatically performed although the relative humidity of the indoor air cannot be decreased by the ventilating operation. In order to prevent the ventilating operation as described above from being continuously performed uneconomically, the select switch 19a of the reference voltage level signal setting circuit 19 is operated so that the reference voltage level signal Sc corresponding to the relative humidity of 100% is produced by the reference voltage level setting circuit 19. Consequently, even when the voltage level of the signal Sa from the electrical signal converting circuit 18 is increased so as to correspond to the relative humidity of 90% or above, the drive signal Sd is not produced by the comparator circuit 20 if the voltage level of the signal Sa does not reach the voltage level of the reference voltage signal Sc corresponding to the relative humidity of 100%, whereby the motor 7 is not energized. In this case, however, when the relative humidity at the indoor side 2 is abnormally increased to 100%, the dewing tends to occur on the indoor side surface 1a of the room wall 1. In such a case, since the voltage level of the signal Sa becomes approximately equal to that of the reference voltage level signal Sc corresponding to the relative humidity of 100%, the drive signal Sd is produced by the comparator circuit 20, thereby energizing the motor 7 to perform the ventilating operation.

When the string 9 of the heat-exchange type ventilating unit 4 is drawn repeatedly, a first draw operation of the string 9 allows the forming of the electrical circuit for energizing the motor 7 independently of the relative humidity sensing of the humidity sensing means 10, thereby performing the ventilating operation. A second draw operation of the string 9 causes the motor 7 to be deenergized, thereby stopping the ventilating operation.

According to the ventilator drive system of the first embodiment, the relative humidity of the air in the vicinity of the indoor side surface 1a of the room wall 1 is sensed by the humidity sensing means. The signal Sa, the voltage level of which is in accordance with the sensed relative humidity, is produced by the sensed humidity sensing means 10. When the voltage level of the signal Sa is increased to the voltage level of the reference voltage level signal Sb corresponding to the relative humidity of 90%, the control circuit 22 acts to energize the motor 7. Consequently, the condition that the dewing tends to occur on the indoor side surface 1a may be sensed, thereby driving the fan assembly 6. The humid indoor air is exhausted to the outdoor side S with the less humid out door air simultaneously introduced to the indoor side 2. Accordingly, the relative humidity of the air in the vicinity of the indoor side surface 1a can be decreased so that the occurrence of the dewing on the indoor side surface 1a of the room wall 1 is prevented. Thus, the problem of damaging the walls of the room and the like owing to the dewing may be solved. That is, the occurrence of the dewing on the indoor side surface 1a of the room wall 1 may be prevented where the relative humidity of the indoor air is so low that comfortable human life is led.

Furthermore, the ventilating operation is automatically started based on the relative humidity sensing operation of the humidity sensing means 10, so that the ventilating operation may be easily started as compared with the case, for example, that an operator draws the string 9 for the ventilating operation to be started. Furthermore, the ventilator drive system of this invention provides a higher level of prevention of the occurrence of the dewing as compared with the case that the operator perceives an occurrence of the dewing on the indoor side surface 1a to thereby start the ventilating operation. Furthermore, the reference voltage level setting circuit 19 is provided with the select switch 19a so that any one of the two reference voltage levels is selectively set in the reference voltage level setting circuit 19. Consequently, here the relative humidity of the outdoor air is high when it is raining or in the rainy season, for example, the reference voltage level signal Sc corresponding to the relative humidity of 100% is beforehand set in the reference voltage level setting circuit 19 and produced therefrom, the motor 7 is not energized even if the relative humidity of the air in the vicinity of the indoor side surface 1a is increased to approximately 90%. The ventilating operation is thus prevented from being performed uneconomically.

More specifically, the relative humidity of air in the vicinity of the indoor side surface of the room wall is sometimes increased to another reference level corresponding to, for example, 90% RH or above in the rainy season in which both of the humidity and the outdoor temperature are high. Since the temperature of the indoor side surface of the room wall is high in the rainy season, the dewing does not occur on the indoor side surface of the room wall even if the relative humidity is increased to 90% RH or above, and accordingly, the ventilating operation is not required. Consequently, the reference level may be set at the value approximate to 100% RH in the rainy season so that the ventilating operation is performed only in the occurrence of the dewing on the indoor side surface of the room wall.

The room humidity is sometimes increased to approximately 100% RH on a rainy day in the rainy season, resulting in the occurrence of the dewing on the indoor side surface of the room wall. Under such a state or condition, the room humidity increased to approximately 100% RH is sensed by the humidity sensing means to thereby execute the ventilating operation so that the dewing is prevented from occurring on the indoor side surface of the room wall.

Consequently, the arrangement of setting in the reference voltage level setting circuit 19 a plurality of reference levels, one of which is approximated to 100% RH, is advantageous in that the execution of the ventilating operation may be prevented when the dewing does not occur on the indoor side surface of the room wall under the condition wherein both the humidity and outdoor temperature are high, as would occur in the rainy season.

FIGS. 5-8 illustrate modified forms of the ventilator drive system in accordance with the present invention.

Figure 5:
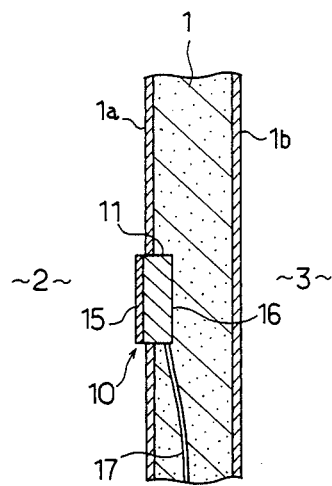
FIG. 5 is a view similar to FIG. 2 in accordance with a second embodiment.

FIG. 5 illustrates a second embodiment of the ventilator drive system in accordance with this invention. The insulated board 11 of the humidity sensing means 10 is embedded in the room wall 1 so that heat is transferred from the room wall 1 to the humidity sensing element 15.

Figure 6:
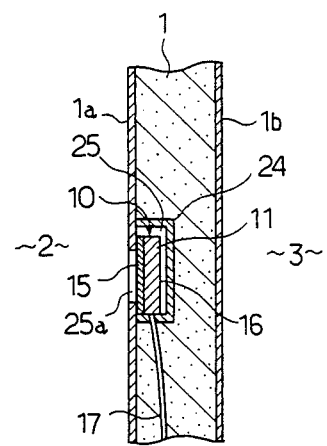
FIG. 6 is a view similar to FIG. 2 in accordance with a third embodiment.

FIG. 6 illustrates a third embodiment. A small hole container 25 is defined by a partitioning member 24 formed of a material having high heat transfer capability. The humidity sensing means 10 is provided in the small hole 25 so that the humidity sensing element 15 thereof faces the indoor side surface 1a of the wall 1 through an opening 25a. Accordingly, the humidity sensing element 15 is substantially placed in the vicinity of the indoor side surface 1a so that the humidity sensing means 10 is brought into contact with the air, the temperature of which is approximately equal to that of the indoor side surface 1a.

Figure 7:
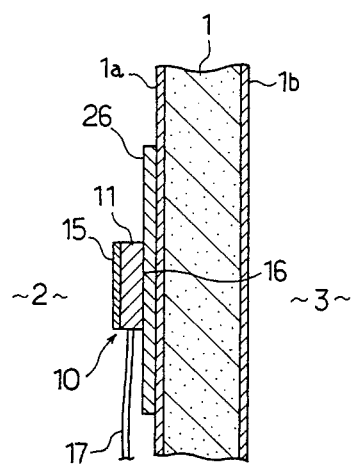
FIG. 7 is a view similar to FIG. 2 in accordance with a fourth embodiment.

FIG. 7 illustrates a fourth embodiment. The humidity sensing means 10 is provided in the same manner as in the first embodiment except that a heat-transferring member 26 is provided between the humidity non-sensitive surface 16 of the humidity sensing means 10 and the indoor side surface 1a of the wall 1.

Figure 8:
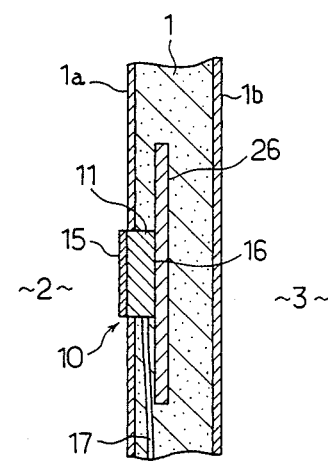
FIG. 8 is a view similar to FIG. 2 in accordance with a fifth embodiment.

In a fifth embodiment shown in FIG. 8, the humidity sensing means 10 is embedded in the wall 1 in the same manner as in the second embodiment. The heat transferring member 26 is provided on the humidity non sensitive surface 16 of the humidity sensing means 10.

In each of the embodiments shown in FIGS. 7 and 8, the heat-transferring member 26 is provided so that heat is well transferred from the room wall 1 to the humidity sensing element 15 therethrough.

The humidity sensing means 10 employed in each of the above described embodiments is provided with an electrical resistance high polymer film wherein the resistance value is increased with the increase of the relative humidity to be sensed. Instead, a ceramic humidity sensing means, wherein a water molecule absorbing phenomenon is utilized, may be employed, for example. In this case, the resistance value is decreased with the increase of the relative humidity to be sensed by the humidity sensing means.

Although the ventilator drive system of the present invention has been applied to the heat exchange type ventilating unit in the above-described embodiments, the invention may be applied to the ventilators of the other types.

The foregoing disclosure and drawings are merely illustrative of the principles of the present invention and are not to be interpreted in a limiting sense. The only limitation is to be determined from the scope of the appended claims.

What is claimed is:

1. A ventilator drive system comprising:
(a) an electric motor for driving a fan for ventilation of a room;
(b) humidity sensing means for sensing the relative humidity of indoor air, said humidity sensing means comprising a humidity sensing element formed from a material having an electrical resistance value which varies when subjected to said humidity and a base plate secured to a wall of said room with a metallic heat transferable member interposed therebetween, said humidity sensing element being disposed on said base plate so that heat is transferred from said wall to said humidity sensing element, said humidity sensing means producing a signal, the level of which corresponds to sensed relative humidity of said indoor air;
(c) reference level setting means for setting a reference level of said relative humidity of said indoor air, said reference level setting means being provided with a plurality of reference levels which are selectively set therein, one of said reference levels corresponding to a relative humidity of approximately 100%, said reference level setting means producing a reference signal, the level of which corresponds to any one of said reference levels of said relative humidity of said indoor air; and
(d) control circuit means for comparing said signal produced from said humidity sensing means with said reference signal produced from said reference level setting means, thereby driving said motor when said relative humidity of said indoor air exceeds said reference level.

* * * * *